United States Patent [19]

Frank

[11] Patent Number: 4,560,433
[45] Date of Patent: Dec. 24, 1985

[54] BI-DIRECTIONAL APPLICATOR HEAD WITH DUAL TAPE SUPPLY

[75] Inventor: Ed Frank, Glenolden, Pa.

[73] Assignee: The Boeing Company, Seattle, Wash.

[21] Appl. No.: 691,379

[22] Filed: Jan. 15, 1985

Related U.S. Application Data

[63] Continuation of Ser. No. 457,853, Jan. 14, 1983, abandoned, which is a continuation-in-part of Ser. No. 192,570, Sep. 30, 1980, Pat. No. 4,382,836.

[51] Int. Cl.[4] .............................. B31F 1/00; B44C 7/00
[52] U.S. Cl. ..................................... 156/459; 156/511; 156/522; 156/526; 156/523; 156/574; 83/282
[58] Field of Search ............... 156/459, 574, 577, 522, 156/523, 526, 511; 83/282

[56] References Cited

U.S. PATENT DOCUMENTS

| | | | |
|---|---|---|---|
| 3,745,086 | 7/1973 | Parker | 156/574 X |
| 3,960,643 | 6/1976 | Dargitz et al. | 156/577 X |
| 4,234,374 | 11/1980 | Frank | 156/459 |
| 4,259,144 | 3/1981 | Ballentine | 156/523 X |
| 4,382,836 | 5/1983 | Frank | 156/459 |

Primary Examiner—Alexander S. Thomas
Attorney, Agent, or Firm—Jones, Tullar & Cooper

[57] ABSTRACT

A tape applicator head for applying two different types of fiber impregnated tape in two opposing directions onto a working surface. The head includes a first dispensing apparatus for one of the tapes, and a second dispensing apparatus for the other of the tapes. The first dispensing apparatus compacts the tape dispensed by the second dispensing apparatus, when the second dispensing apparatus dispenses in one direction. When dispensing in the other direction, the second dispensing apparatus compacts the tape which it dispenses. The first dispensing apparatus compacts its tape in both directions.

6 Claims, 9 Drawing Figures

BI-DIRECTIONAL APPLICATOR HEAD WITH DUAL TAPE SUPPLY

CROSS-REFERENCE TO RELATED APPLICATION

This is a continuation of co-pending application Ser. No. 457,853 filed on Jan. 10, 1983, abandoned, which application is a continuation-in-part application of application Ser. No. 192,570, filed Sept. 30, 1980, now U.S. Pat. No. 4,382,836.

BACKGROUND OF THE INVENTION

1. Field of the Invention

The invention, applies generally to tape dispensing and application equipment and, more particularly, to a bi-directional tape applicator head with dual tape supply.

The invention was developed primarily for use in the field of composite technology. In particular, the invention is used in constructing structural and aerodynamic parts of an aircraft. However, the invention can also be used for the construction of structural and aerodynamic parts for craft other than aircraft, for the construction of missiles, satellites, automobile bodies, rail cars, ships and the like.

According to composite technology, a resin preimpregnated tape having, for example, fiberglass filaments is utilized with or without additional resin adhesive to construct the particular part desired. The final part is built-up of a successive application of layers of the tape to a working surface as, for example, a mandrel. The resulting part is light in weight and highly load redundant, so it is more desirable than a corresponding part made from traditional materials such as steel, aluminum, etc.

2. Prior Art

U.S. Pat. No. 4,259,144 discloses a bi-directional tape applicator head for dispensing and compacting tape in two opposing directions onto a working surface. The tape is fed vertically between two spaced, symmetrically-orientated dispensing blocks onto the working surface. As the head moves in one direction, one of these blocks engages the tape and imparts a tension to the tape to draw the tape past the dispensing block to the working surface. At the end of the tape laying pass, the directional motion of the head is reversed, causing the tape to be disengaged from the one dispensing block and engaged with the other dispensing block, which folds the tape back on itself and compacts it against the previously laid layer of tape. The tape applicator head includes a tape shearing mechanism disposed between the tape supply and the dispensing blocks shearing the tape upon completion of the tape laying operation. The tap applicator head also includes a tape advancement mechanism for feeding tape from the tape supply between the two dispensing blocks onto the working surface to initiate a tape laying operation. The tape advancement mechanism includes a cam roller and an idler roller which are mounted adjacent to each other on opposite sides of the tape. The cam roller has an outermost surface which is semicircular in cross section, and which engages the tape as the cam roller is rotated. The circumference of this semicircular portion is at least equal to the distance between the end of the tape and the working surface, so that as the cam roller is rotated, tape will be advanced through the two dispensing blocks onto the working surface.

In this known tape applicator head, tape distortions such as wrinkles or folds, can frequently be introduced to the tape as it is folded back upon itself during reversal of the tape placement. Also, since both of the dispensing blocks are disposed the same distance from the working surface, difficulty can be encountered in laying different lengths of tape to form a contoured part of varying thickness, in that the block not engaged with the tape being layed may engage with the end of a previously laid tape layer. Also, the tape advancement mechanism of this known tape applicator head is suitable only for vertical advancement of the tape, since it includes no means for holding and guiding the tape through the shearing mechanism and between the two dispensing blocks.

In U.S. Pat. No. 4,234,374 another bi-directional tape applicator head is described for dispensing and compacting tape to opposite directions onto a working surface. This second known tape applicator head includes a rotation rack assembly onto which the two dispensing blocks are mounted to be stationary relative to each other but to shift their positions in unison relative to the remainder of the head at the end of the tape laying pass. This movement of the dispensing blocks produces a step-over, or loop, in the tape at the end of each tape laying pass which prevents distortion of the tape as the tape is folded back on itself during reversal of the tape placement direction. Also, the dispensing block which is not engaged with the tape as the head is moved in a particular one of the two opposing directions, is spaced a predetermined distance from the working surface, to eliminate the possibility of this block engaging the end of a previously laid tape layer. Also, in this tape applicator head, the tape may be fed onto the working surface in any direction, horizontal or vertical.

However, this last mentioned known tape applicator head does not include tape feeding and shearing mechanisms. Consequently, this tape applicator head is best suited for laying up laminated parts from a continuous length of composite tape, which is folded back on itself on reversal of tape-placement direction rather than forming contoured laminated parts requiring a plurality of different lengths of tape.

In these applicator heads, the tape is either unidirectional or X-ply, i.e., the tape filaments are parallel to the longitudinal axis of the tape (unidirectional) or inclined at an angle to the longitudinal axis of the tape (X-ply).

For those structures which only require one type of tape (unidirectional or X-ply), the applicator heads noted above are well suited. Many times, however, a structure requires both types of tape. In this event, the applicator heads noted above are not entirely satisfactory because of the need to change and re-thread the tape head with the different type of tape.

OBJECT AND SUMMARY OF THE INVENTION

It is, therefore, the principal object of the present invention to provide a tape applicator head which can dispense more than one type of tape.

According to the present invention, a tape applicator head is adapted to dispense two types of tape onto the same work surface in two directions. The applicator head includes a source of supply for each tape and a single rotation rack assembly. The rotation rack assembly serves as part of the mechanism to dispense and compact one of the two tapes and to compact the other tape when it is dispensed in one of the two directions. Compacting of the other tape in the other direction is accomplished by the feeder mechanism of the other tape.

DETAILED DESCRIPTION OF THE PREFERRED EMBODIMENT

Figure 1:
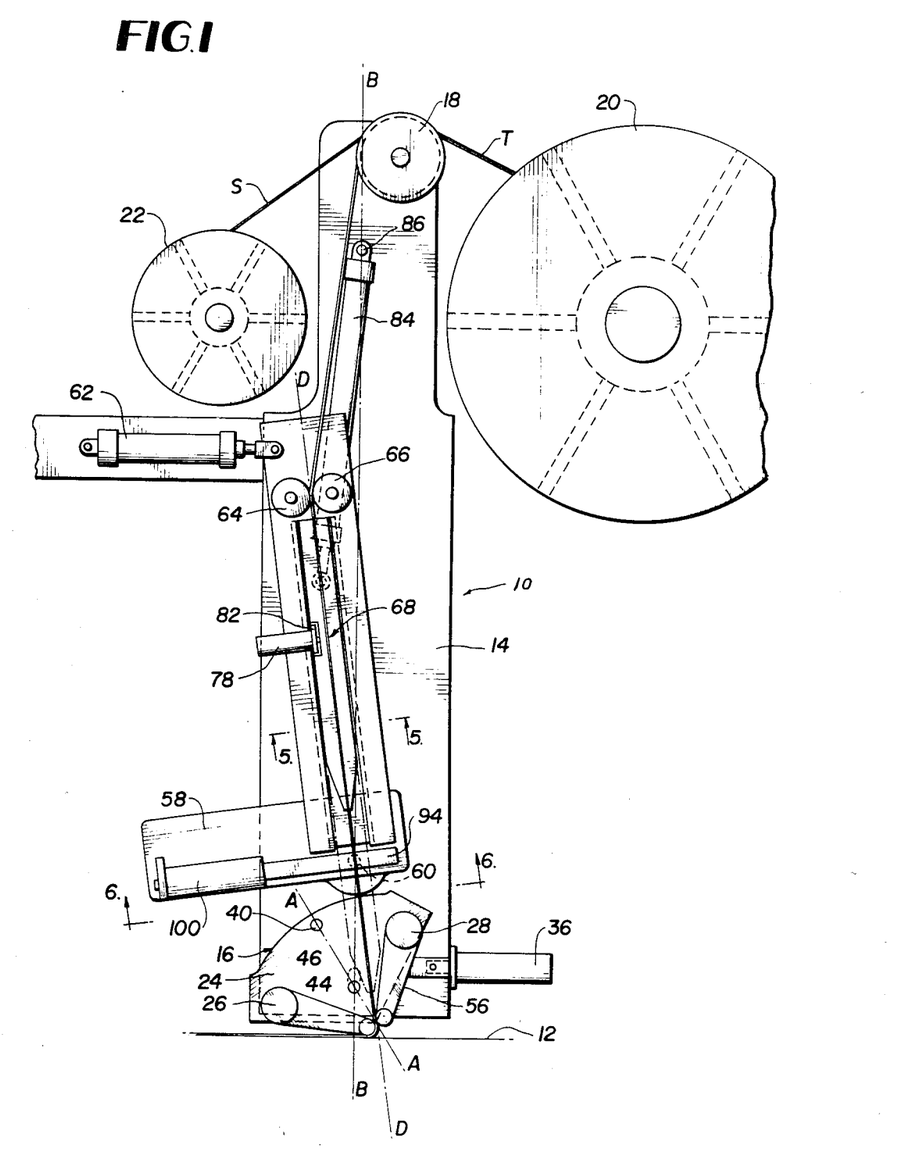
FIG. 1 is a plan view of a tape applicator head, showing the movable components disposed to apply tape to a working surface in a direction from left to right.

The tape applicator head 10 of FIG. 1 is carried by a stationary support structure or carriage in a manner not shown, for displacement relative to a working surface 12. The tape applicator head 10 can have as many degrees of freedom of movement relative to the working surface 12 as desired. The manner in which this is accomplished is not part of the invention. It is dictated primarily by the shape of the structure to be constructed. Preferably, the tape applicator head 10 is mounted for displacement along three mutually orthogonal axes relative to the work surface 12. In addition, the head may be rotatable relative to any or all of these three axes.

Alternatively, it is also possible to mount the tape applicator head in a stationary manner and to move the work surface 12 relative to the applicator head 10. Whether the applicator head 10 or the working surface 12 is moved is optional, and the structure for moving them is not discussed in further detail herein since it does not form a part of the invention.

The tape applicator head 10 includes an elongated mounting structure 14 which is affixed to the carriage of the tape applicator head. A rotation rack assembly 16 is mounted to one end of the mounting structure 14 to be positioned adjacent the working surface 12. A tape receiving roller 18 is pivotally mounted at the opposite end of the mounting structure 14 to receive the tape T from a supply reel 20 which is mounted to the carriage in a manner not shown. Also, the applicator head 10 may include a takeup reel 22, also mounted to the carriage, for removing and winding the backing strip S from the tape.

Figure 2:
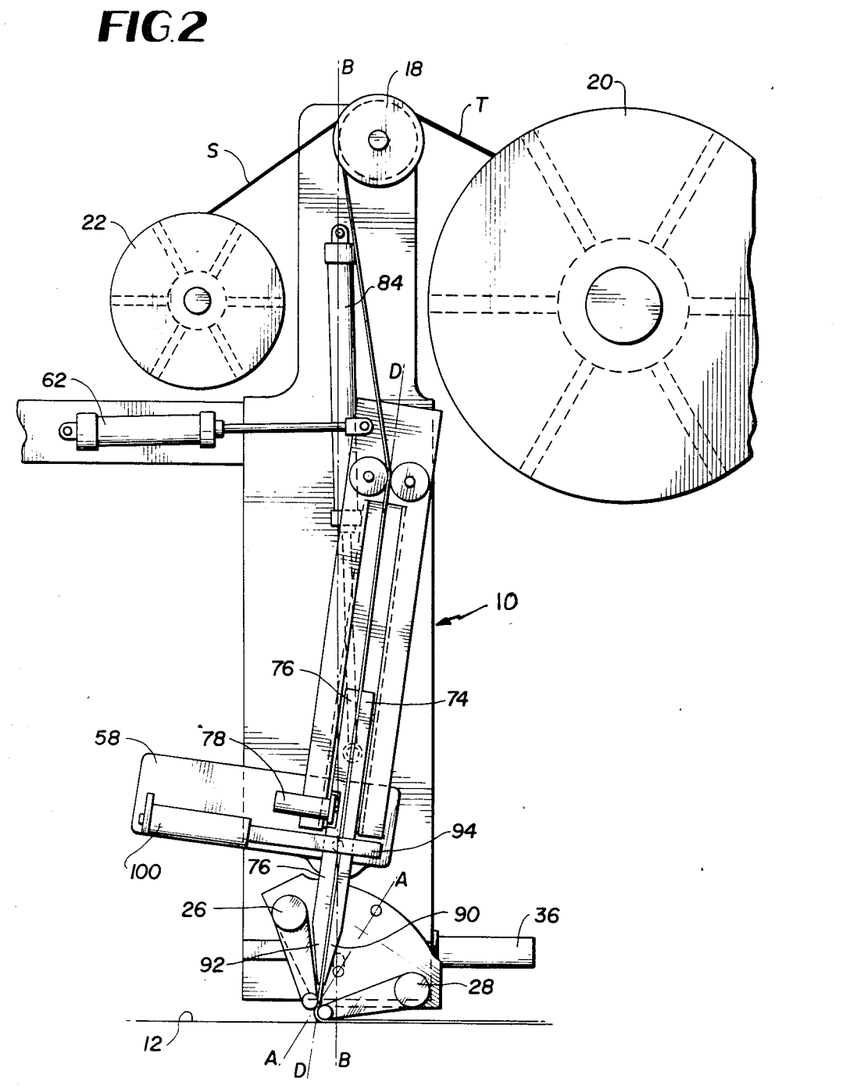
FIG. 2 is another plan view of the tape applicator head of FIG. 1 showing the movable components disposed in alternate positions.
Figure 3:
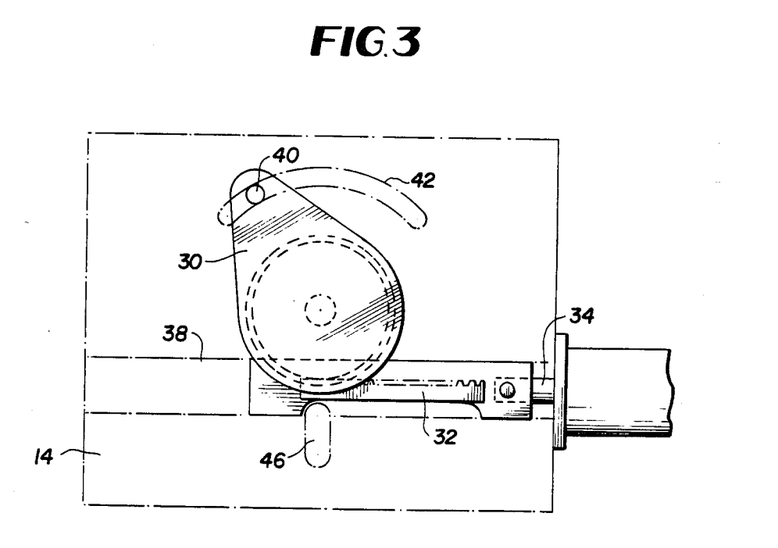
FIG. 3 is a plan view of a rotation rack assembly of the tape applicator head of FIG. 1, exclusive of the dispensing and compacting blocks and their mounting plate.

The rotation rack assembly 16 includes a swivel plate 24, on which a pair of dispensing and compacting blocks 26 and 28 are rigidly mounted, and a transmission including a gear 30 and a rack 32, as shown in FIG. 3. The gear 30 is pivotally mounted to the mounting structure 14. The rack 32 is embodied as an extension of a reciprocating rod 34 of an actuator 36 for moving the swivel plate 24 between a first position (FIG. 1) and a second position (FIG. 2). The rack 32 is slideable within a slot 38 formed in the mounting structure 14.

The two dispensing and compacting blocks 26 and 28 are symmetrically disposed on opposite sides of a center line A—A of the swivel plate 24. The swivel plate 24 is pivotally connected to the gear 30 by a pin 40 disposed on the center line A—A of the swivel plate 24. The pin 40 extends through the gear 30 into an arcuate slot 42 formed in the mounting structure 14. The opposite ends of the arcuate slot 42 serve as stops for positioning the swivel plate 24 in its two positions. The swivel plate also includes a pivot pin 44, disposed on the center line A—A, for pivotally and slideably connecting the swivel plate 24 to the mounting structure 14. The pivot pin 44 is received in and travels along a slot 46 formed in the mounting structure 14 and extending along a center line B—B orthogonal to the working surface 12.

Figure 4:
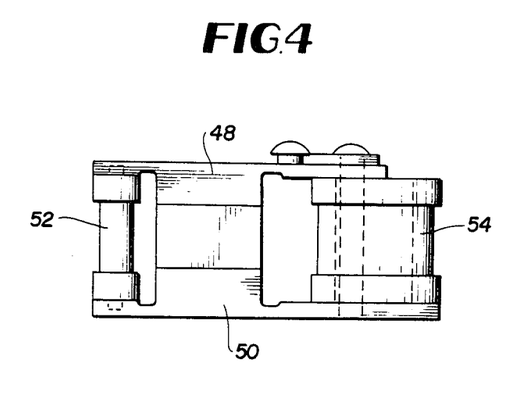
FIG. 4 is a side view of a dispensing and compacting block exclusive of the block belt.

The dispensing and compacting blocks 26, 28 are constructed as shown in FIG. 4. Each block 26, 28 includes side plates 48 and 50 between which rollers 52 and 54 are mounted. A belt 56 (FIG. 1) extends about the two rollers 52 and 54.

The swivel plate 24, and the dispensing and compacting blocks 26, 28 fixed to the swivel plate 24, are pivotally and translationally shifted between their two positions at each terminal end of a tape laying pass by the actuator 36 in the same manner as the rotation rack assembly described in the above referenced U.S. Pat. No. 4,259,144 which is hereby incorporated by reference.

Figure 6:
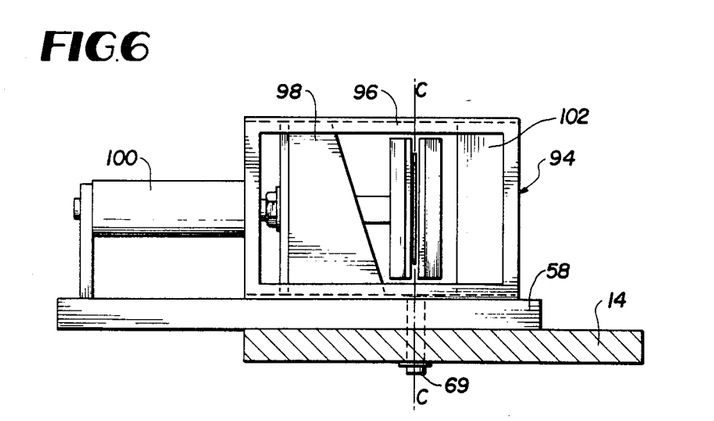
FIG. 6 is an end view of the tape shearing mechanism, taken along the lines 6—6 of FIG. 1.

One end of a support member 58 is pivotally connected to the mounting structure 14, for example, by a pivot pin 60, to allow movement of the support member 58 with respect to the mounting structure 14 about a pivot axis C—C (FIG. 6). An actuator 62 is connected between an opposite end of the support member 58 and the carriage in a manner not shown to pivotally shift the support member 58 between a first position, shown in FIG. 1, and a second position, shown in FIG. 2. Two adjacent guide rollers 64, 66, through which the tape extends, are pivotally connected to the support member 58 adjacent the opposite end thereof.

Figure 5:
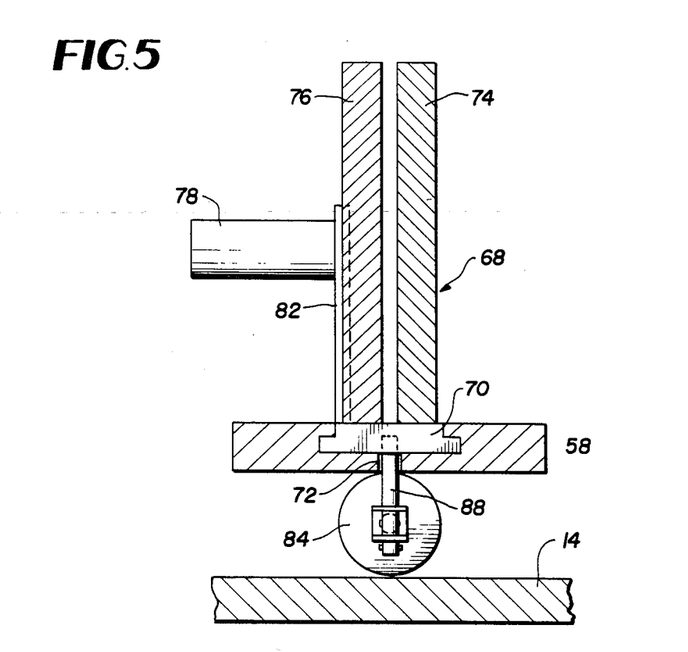
FIG. 5 is an end view of the tape feeder assembly, taken along the lines 5—5 of FIG. 1.

A tape feeder assembly 68 is slideably carried by the support member 58 for translation along a linear path which is parallel to a center line D—D of the support assembly 58 extending between the guide rollers 66 and intersecting the pivot axis C—C of the support member 58. As shown in FIG. 5, the feeder assembly 68 includes a guide plate 70 which is slideably disposed within a slot 72 of the support member 58 which defines the path of travel of the feeder assembly 68. The feeder assembly 68 includes the two adjacent, parallel-disposed, tape feeder plates 74, 76, through which the tape extends. The feeder plate 74 is affixed to the guide plate 70. The other feeder plate 76 is attached to an actuator 78 mounted to the guide plate 70 for moving the feeder plate 76 between a disengaged position at which the two feeder plates 74, 76, are spaced from each other and from the tape extending therebetween, and an engaged position at which both of the feeder plates 74, 76, are engaged with opposite sides of the tape extending therebetween. The actuator 78 is connected to the guide plate 70 by a mounting plate 82 which is affixed to, or integral with, the guide plate 70.

An actuator 84 is pivotally connected at one end by a pivot pin 86 to the mounting structure 14 and is pivotally connected at an opposite end to the feeder assembly 68 by a pivot pin 88 affixed to the guide plate 70 and extending from an opposite side of the support member slot 72. The actuator 84 is arranged to move the feeder assembly 68 along the linear path of travel defined by the slot 72 between a retracted position, shown in FIG. 1, at which the feeder assembly 68 is disposed between the guide rollers 64, 66 and the pivot axis C—C of the support member 58 defined by the pivot pin 60, and an extended position, shown in FIG. 2, at which the tapered ends 90, 92 of the feeder plates 74, 76 extend between the dispensing and compacting blocks 26, 28 in close proximity to the tape engaging surface portions of these blocks 26, 28.

A guillotine-type tape shearing mechanism 94, through which the tape extends, is mounted to the support member 58 adjacent the pivot pin 60. As shown in FIG. 6, the shearing mechanism 94 includes a frame 96 affixed to the support member 58, a tape cutting blade 98 slideably held within the frame 96 for movement across the path of the tape, and an actuator 100 connected between the blade 98 and the support member 58, for moving the blade 98 between an open position in which it is spaced from the tape extending through the shearing mechanism 94 and a closed position at which the blade 98 engages an anvil member 102 affixed to the support member 58 after shearing the tape.

The pivot axis C—C of the support member 58 defined by the pivot pin 60 is disposed along the center line B—B, passing through the pivot axis of the swivel plate 24 defined by the pivot pin 44, which is equidistant from the first and second positions of the pin 40 carried by the swivel plate 24. The first position of the support member 58, shown in FIG. 1, is selected so that the guide roller 66 of the support member 58 and the dispensing block 26 of the rotation rack assembly 16 engaging the tape define a linear path of travel for the tape which passes through the pivot axis C—C of the support member 58. Similarly, the second position of the support member 58 shown in FIG. 2 is selected so that, when the swivel plate 24 is disposed in its corresponding second position, the guide roller 64 and the dispensing block 28 engaging the tape define the linear path of travel for the tape which also passes through the pivot axis C—C of the support member 58 defined by the pivot pin 60. Thus, when the swivel plate 24 and the support member 58 are both disposed in their corresponding first or second positions, and the movable feeder plate 76 is disposed in its unengaged position, the feeder assembly 68 can be moved between its retracted and extended positions without engaging the tape extending through the feeder assembly 68. Also, since the angular displacement of the swivel plate 24 when it is disposed in its first position, relative to the center line B—B between the pivot axis C—C of the support member 58 and the pivot axis of the swivel plate 24 defined by the pivot pin 44 is equal, and opposite to the angular displacement of the swivel plate 24 when it is disposed in its second position relative to the same center line B—B, the displacement of the guide roller 66 from the center line B—B when the support member 58 is disposed in its first position will be approximately equal to and opposite the displacement of the guide roller 64 from the center line B—B when the support member 58 is disposed in its second position.

The pivot pin 86 connecting the feeder assembly actuator 84 to the support member 58 is also disposed along the center line B—B, so that the work requirements of the feeder assembly 68 between its retracted and extended positions are the same regardless of whether the support member 58 and the swivel plate 24 are disposed in either their corresponding first or second positions. Also, the tape receiving roller 18 is disposed so that the point on its periphery at which the tape is disengaged falls on the center line B—B, so that the support member 58 can be shifted between its first and second position without increasing the tension in the tape or causing slack in the tape between the receiving roller 18 and the dispensing blocks 26, 28.

Since the feeder plates 74, 76 of the feeder assembly 68 must extend through the open tape shearing mechanism 94 when the support member 58 and the swivel plate 24 are disposed in either their corresponding first or second positions, the tape shearing mechanism 94 is disposed adjacent the pivot pin 60, defining the pivot axis C—C of the support member 58, to thus minimize the clearance required between the open blade 98 and the anvil 102 to allow passage of the feeder plate 74, 76 therebetween.

Preferably, all surfaces of the various elements of the tape applicator head 10 which engage the tape are formed from or coated with a material, such as teflon, having inherent release characteristics. These tape engaging surfaces include the peripheral surfaces of the rollers 18, 64, and 66, the adjacent planar surfaces of the feeder plates 74 and 76, and the peripheral surfaces of the belts 56 of the dispensing and compacting blocks 26 and 28.

To prepare a tape laying run in one direction, for the applicator head shown in FIGS. 1 and 2, the feeder plate actuator 78 is actuated to move the feeder plate 76 to its disengaged position, the feeder assembly actuator 84 is actuated to move the feeder assembly 68 into its retracted position, and the shearing mechanism actuator 100 is actuated to move the blade 98 to its open position, if these various elements are not already so disposed. The rotation rack assembly actuator 36 and the support member actuator 62 are then actuated to move the swivel plate 24 and the support member 58 into their corresponding first or second positions proper for the direction in which tape is to be applied against the working surface 12. Next, a roll of tape is loaded onto the supply reel 20 and the tape is passed over the receiving roller 18. The backing strip S of the tape T is stripped from the end of the tape and attached to the takeup reel 22. The tape is then fed between the guide rollers 64, 66, the feeder plates 74, 76, and the dispensing and compacting blocks 26, 28. The tape applicator head 10 is then moved at an acute angle towards the working surface 12 to wipe the tape extending through the dispensing and compacting blocks 26, 28 about the block closest to the working surface 12, which is then positioned so that the minimum clearance between the tape engaging surface portion of this block and the working surface is less than the thickness of the tape. This is illustrated in FIG. 1, which shows the various elements of the applicator head 10 disposed in the proper positions for executing a tape laying pass in a direction from left to right as shown in this Fig. The feeder element 76 is disposed in its open position, the feeder assembly 68 is disposed in its retracted position, the tape-shearing mechanism 94 is open, and the support member 58 and swivel plate 24 are disposed in their first positions for applying tape in a direction from left to right. The tape is engaged with the receiving roller 18, the guide roller 66, and the dispensing and compacting block 26, which compacts this tape against the working surface 12 as the tape applicator head 10 is moved to the right, as shown in FIG. 1.

When it is desirable to apply individual lengths of tape in opposite directions, rather than apply a continuous length of tape which is folded over at the terminal end of each tape laying pass, the tape laying pass in a direction from left to right as shown in FIG. 1 is stopped at a predetermined distance before the end of required dimension to be reached, which is equal to the length of tape extending from the tape shearing mechanism 94 at the pivot axis C—C of the support member 58 about the dispensing and compacting block 26 to the working surface 12. The actuator 100 is then actuated to move the blade 98 from its open position to its closed position, and back to its open position, to shear the tape. Travel of the tape applicator head is then reinitiated in a direction from left to right as shown in FIG. 1 to complete placement and compacting of the tape onto the working surface 12, after which the tape applicator head 10 is moved away from the working surface 12.

The feeder plate actuator 78 is actuated to move the feeder plate 76 into its engaged position at which the tape is clamped between the feeder plates 74, 76 to maintain proper projection of the tape beyond these feeder plates 74, 76 to the shearing mechanism 94. The support member actuator 62 and the rotation rack assembly actuator 36 are then activated to move the support member 58 and the swivel plate 24 into their second positions shown in FIG. 2, proper for tape placement in a right to left direction. The feeder assembly actuator 84 is then actuated to move the feeder assembly 68 from its retracted position to its extended position, also shown in FIG. 2, to feed the tape projecting from the feeder plates 74, 76 between and a predetermined distance beyond the dispending and compacting blocks 26, 28. The tape applicator head 10 is then moved toward the working surface 12 at an angle so as to wipe the tape extending through and beyond the dispending and compacting rollers 26,28 about the dispensing and compacting block 28, until the clearance between the block 28 and the working surface is less than the thickness of the tape. The feeder plate actuator 78 is actuated to move the feeder plate 76 to its disengaged position, and the feeder assembly actuator 84 is then actuated to move the feeder assembly 68 to its retracted position. The tape, which is held against the working surface 12 by the block 28, is disengaged from the feeder plates 74, 76 as these plates are moved to their disengaged, retracted positions.

If, at the end of this next tape laying pass, from right to left as shown in FIG. 1, it is desired to fold the tape back upon itself and apply another layer of tape in a direction from right to left, the rotation rack assembly actuator 36 and the support member actuator 62 are actuated to move the swivel plate 24 and the support member 58 from their second positions to their first positions proper for tape placement in a left to right direction, as seen in FIG. 1, during which the pivotal and translational movement of the dispensing and compacting blocks 26, 28 produce a localized tension relieving loop in the tape, in the same manner as described in the above-referenced U.S. Pat. No. 4,234,374.

Since the support member 58 and the swivel plate 24 are both switched between their first and second positions at the same time, the support member actuator 62 could be eliminated by making the support member 58 integral with the swivel plate 24, with the guide rollers 64, 66, being disposed on opposite sides of the center line A—A between the pins 40, 44 of the swivel plate 24. However, in such an embodiment, the angular travel of the guide rollers 64, 66 would be the same as that of the dispensing and compacting blocks 26, 28, which would greatly increase the spacing between the supply reel 20 and the takeup reel 22 and, consequently, the width of the tape applicator head 10. By pivotally connecting the support member 58 to the mounting structure 14 at a point spaced from the point at which the swivel plate 24 is pivotally connected to the mounting structure 14, as shown in the embodiment of FIG. 1, the angular travel of the support member 58 between its first and second positions can be greatly reduced, to thus result in a relatively small and compact tape applicator head 10.

Also, the feeder assembly actuator 84 could be disposed to extend along the center line D—D, with one end connected to the support member 58 and an opposite end connected to the feeder assembly 68. However, in such an embodiment, the length of the support member 58 and the total mass moved by the actuator 78 would be greatly increased over that of the embodiment of FIG. 1.

Figure 7:
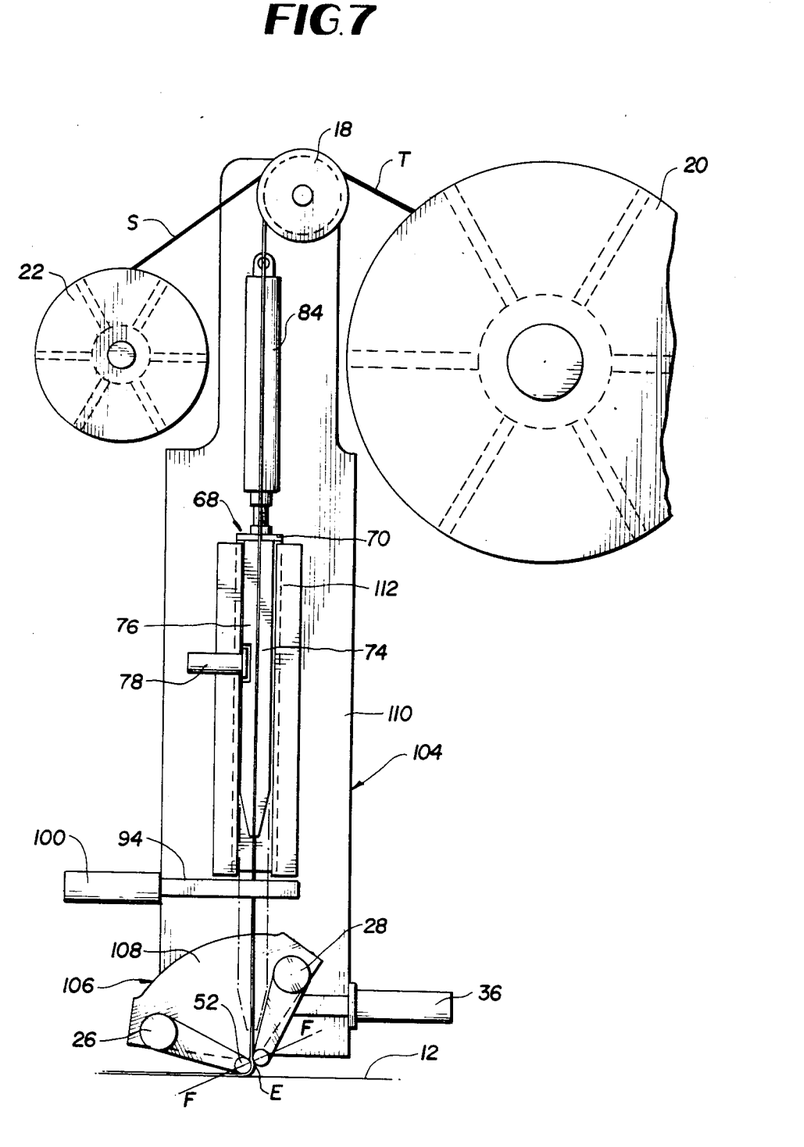
FIG. 7 is a plan view of another embodiment of the invention showing the movable components disposed to dispense and compact tape in one direction onto a working surface.
Figure 8:
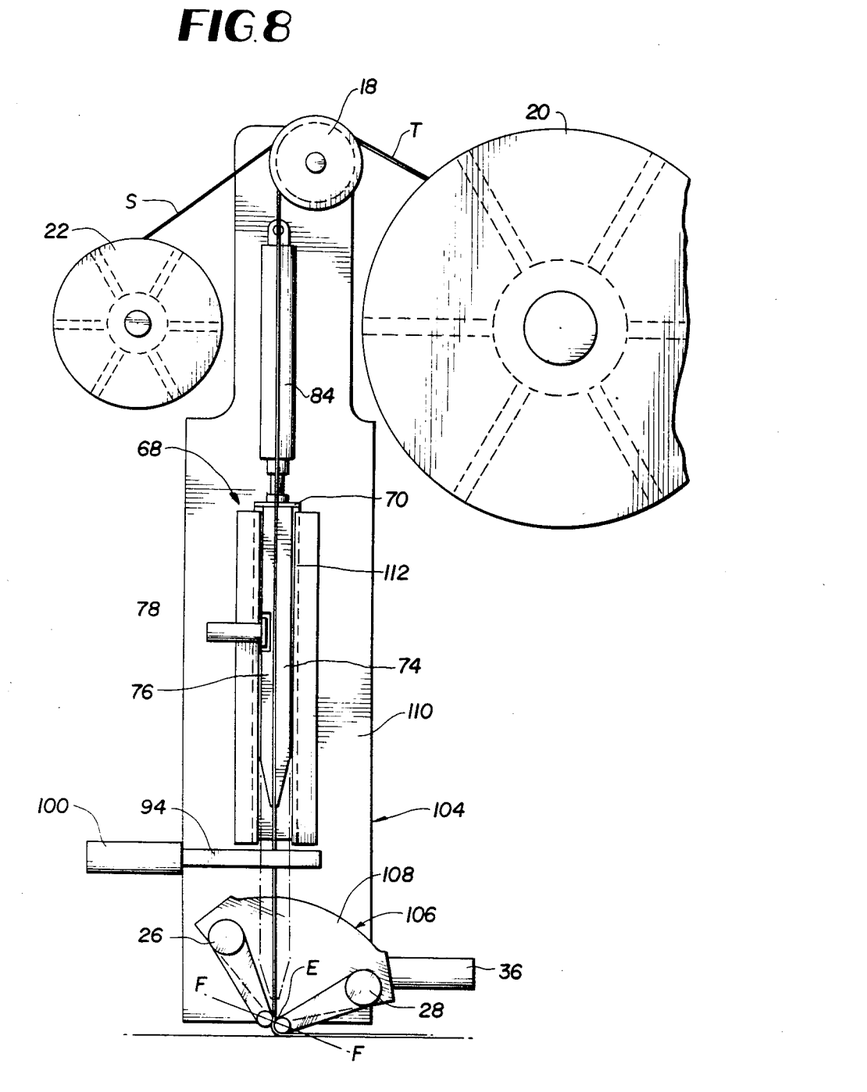
FIG. 8 is another plan view of the embodiment shown in FIG. 7, in which the movable components are disposed in alternate positions.

The tape applicator head 104 shown in FIGS. 7 and 8 may be used to dispense and compact tape in two opposing directions onto a working surface where the ability to produce a tension-relieving loop in the tape end of each tape laying pass is not required, as for example, where individual lengths of tape are applied during each tape laying pass. The same identifying numbers have been used for the elements in the embodiment of FIG. 7. corresponding to similar or identical elements in the embodiment of FIG. 1.

In FIG. 7, a rotation rack assembly 106 includes a swivel plate 108 having affixed thereto two dispensing and compacting blocks 26, 28. Each dispensing and compacting block 26, 28 includes side plates 48 and 50 (FIG. 4) between which rollers 52 and 54 are mounted, and a belt 56 which extends about the two rollers 52 and 54. The swivel plate 108 is pivotally connected to a mounting structure 110 of the tape applicator head 104 for rotation about a pivot axis E extending parallel to the axes of the dispensing and compacting block rollers 52 and passing through the midpoint of the center line F—F extending between the two rollers 52 of the dispensing and compacting blocks 26, 28. The swivel plate 108 is pivotable about the axis E from a first position, shown in FIG. 7, at which the dispending and compacting block 26 is correctly positioned for laying and compacting tape against the working surface 12 in a direction from left to right, and a second position, shown in FIG. 8, at which the dispensing and compacting block 28 is correctly positioned to dispense and compact tape against the working surface 12 in a direction from right to left.

A tape receiving roller 18 is mounted at an opposite end of the mounting structure 110 to receive tape from a tape supply reel 20 and to define, together with the two dispensing and compacting blocks 26, 28, a path of travel for the tape extending from the receiving roller 18 through the dispensing and compacting blocks 26, 28 to the work surface 12 which is substantially orthogonal to the direction of tape placement. A tape feeder assembly 68, through which the tape extends, is slideably mounted to the mounting structure 110 for linear movement along a path of travel parallel to the tape extending through the feeder assembly 68. The feeder assembly 68 includes a guide plate 70 which is slideably disposed within a slot 112 extending through the mounting structure 110 and defining the feeder assembly path of travel. The feeder assembly 68 includes a fixed feeder plate 74 and a moveable feeder plate 76 disposed on opposite sides of the tape extending through the feeder assembly 68. The fixed feeder plate 74 is affixed to one side of the guide plate 70, and the moveable feeder plate 76 is connected to an actuator 78 carried by the guide plate 70, for movement of the feeder plate 76 between a disengaged position at which the feeder plates 74, 76 engage opposite sides of the tape extending therebetween.

A guillotine-type tape shearing mechanism 94, through which the tape extends, is disposed on the mounting structure 110 adjacent the swivel plate 108. The shearing mechanism 94 includes a blade 98 which is connected to an actuator 100 for holding the blade between an open position and a closed position to shear the tape extending therethrough. When the blade 98 is disposed in its open position, the feeder assembly 68 is moveable by the actuator 84 from its retracted position to its extended position at which position the feeder plates 74, 76, extend through the shearing mechanism 94 towards the pivot axis E of the swivel plate 108.

The procedure for using the tape applicator head 104 of FIG. 7 to dispense and compact a length of tape in one direction against the working surface 12 and to dispense and compact another length of tape against the working surface 12 in an opposing direction, is similar to the same procedure described above in connection with the embodiment of FIG. 1. The tape applicator head 104, as shown in FIG. 7, has its various elements properly disposed for initiating a tape laying pass in a direction from left to right. The blade 98 is disposed in its open position, the feeder plate 76 is disposed in its disengaged position, the feeder assembly 68 is disposed in its retracted position, and the swivel plate 108 is disposed in the proper position for the dispensing and compacting block 26 to dispense and compact the tape against the working surface 12 as the tape applicator head 104 is moved to the right relative to the working surface 12. The linear tape placement is stopped a predetermined distance before the end of the required dimension to be reached, which is equal to the length of tape extending from the shearing mechanism 94 about the dispensing and compacting block 26 to the working surface 12. The tape is then sheared by the shearing mechanism 94 and the linear tape placement in a direction from left to right is continued to complete placement of the tape. Next, the tape applicator head 104 is moved away from the working surface 12, the actuator 78 is actuated to clamp the tape between the feeder plates 76, 78 and a swivel plate actuator 114 is actuated to pivotally move the swivel plate 108 about the axis E from its first position to its second position at which the dispensing and compacting block 28 is properly disposed for laying tape onto the working surface 12 in a direction from right to left, as seen in FIG. 8. The feeder assembly actuator 84 is then actuated to move the feeder assembly 68 from its retracted position through the open shearing position 94 to its extended position, to move the portion of the tape extending from the feeder plate 74, 76 between and a predetermined distance beyond the dispensing and compacting blocks 26, 28.

The tape applicator head 104 is then moved at an angle towards the working surface 12 until the minimum clearance between the dispensing and compacting block 28 and the working surface 12 is less than the thickness of the tape extending about and between the block 28 and the working surface 12. The actuator 78 is actuated to move the feeder plate 76 to its disengaged position, and then the actuator 84 is actuated to move the feeder assembly 68 to its retracted position, disengaging the tape from the feeder plates 76, 78. The tape applicator head 104 is then moved to the left relative to the working surface 12 as seen in FIG. 8, to apply and compact the tape against the working surface 12 in an opposing direction.

Often it becomes desirable to fabricate a structural part having more than one type of tape, for example, unidirectional and X-ply tape. For this purpose the applicator head 114 (FIG. 9) has been developed.

Figure 9:
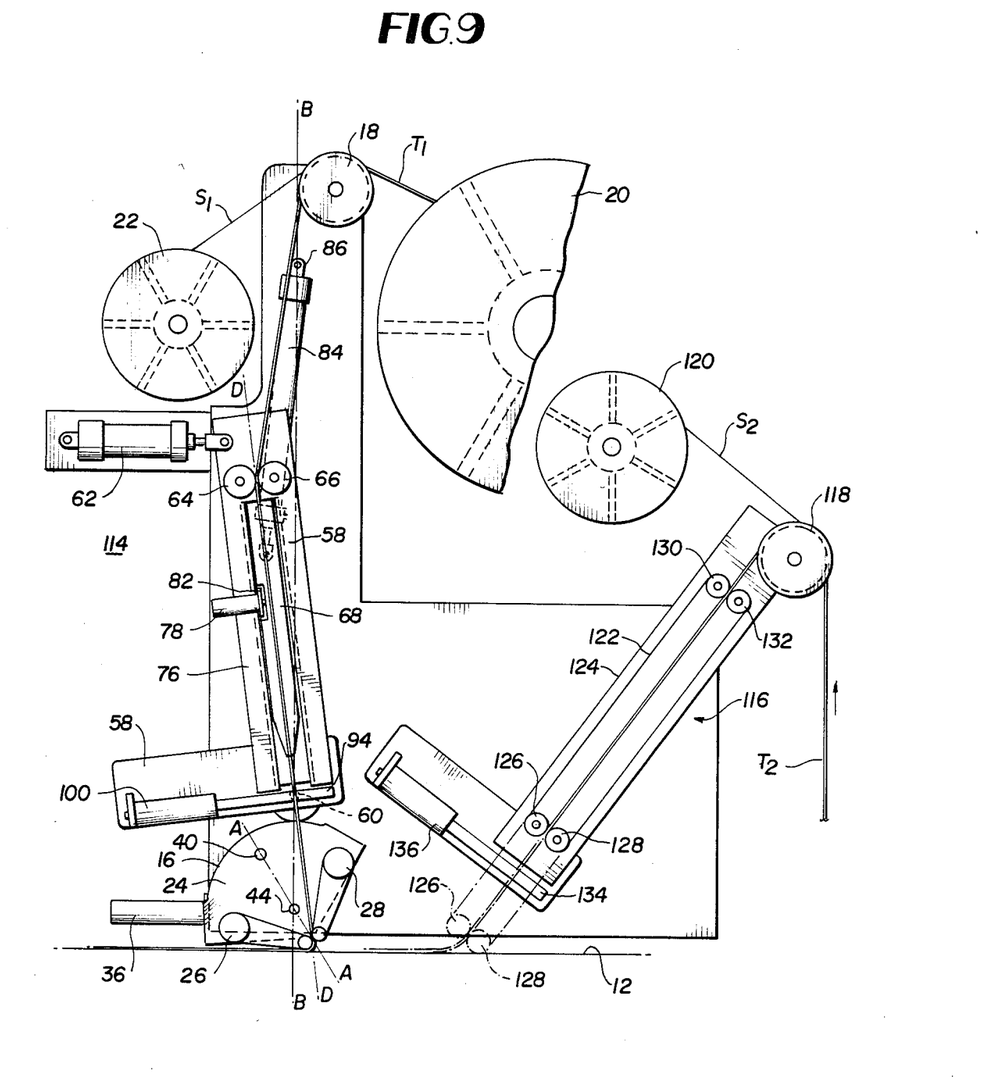
FIG. 9 is a plan view of a tape applicator head showing one embodiment of the dual tape application.

The applicator head 114 includes an assembly for feeding, dispensing and compacting the tape $T_1$. The assembly may be similar to that of either the embodiment of FIGS. 1-2 or that of FIGS. 7-8. For this purpose the embodiment illustrated in U.S. Pat. No. 4,234,374 could also be used. In any case, a feeding and partial compacting assembly 116 for tape $T_2$ is provided. The tape $T_2$ is supplied from a supply reel (not shown) over a tape receiving roller 118. The backing strip $S_2$ is wound on a takeup reel 120. The tape without the backing strip $S_2$ is passed to a belt drive 122 mounted within a housing 124 for axial displacement toward the working surface 12. The means for advancing and retracting the belt drive 122 are not shown. The belt drive 122 includes four rollers 126, 128, 130 and 132. Preferably either roller 130 or 132 is driven by means not shown to advance the tape outwardly from rollers 126 and 128. The roller 128 serves as a compacting roller during the dispensing of tape onto working surface 12 when the applicator head 114 is moved to the left as shown in FIG. 9. For this purpose, the belt drive 122 is in the location indicated by the dashed lines. To dispense tape in the opposite direction, i.e., from left to right as shown in FIG. 9, the roller 126 is utilized. When dispensing tape in this direction, compaction is achieved by the compacting block 26 of the rotation rack assembly 16. For this purpose the assembly 16 is oriented as shown in FIG. 9. To sever the tape a blade 134 and actuator 136, similar to the blade 94 and actuator 100 are provided.

The rotation rack assembly 16 serves as a first dispensing means, while the feeding and partial compacting assembly 116 serves as a second dispensing means. The first dispensing means advances and dispenses (including compacting) the unidirectional tape $T_1$ in two opposed directions, while the second dispensing means advances and dispenses tape $T_2$ in two directions and compacts it in only one direction. The tape $T_2$ is compacted in the other direction by the first dispensing means.

What is claimed is:
1. A tape applicator head for applying two different types of fiber impregnated tape in two opposing directions onto a working surface, the different types of tape being distinguished by the orientation of the fibers, comprising:
   separate supply means for supplying each type of tape;
   mounting means;

first dispensing means, mounted to the mounting means adjacent the working surface, which includes two spaced dispensing blocks between which one of said tapes passes and which alternately engage the tape during movement of the head in the two opposing directions, for imparting a tension to the tape to draw the tape past the dispensing blocks onto the working surface, and compacting the tape so dispensed in each direction; and second dispensing means, mounted to the mounting means adjacent the working surface, which includes means for imparting a tension to the other of said tapes and advancing said tape to the working surface, and for compacting the tape so dispensed during movement of the head in only one of said two opposing directions, wherein said first dispensing means compacts the other of said tapes during movement of the head in the other of said two opposing directions.

2. The tape applicator head as defined in claim 1, further comprising:

first shearing means associated with said first dispensing means, through which said one of said tapes extends, for engaging and shearing said one of said tapes; and second shearing means associated with said second dispensing means through which said other of said tapes extends for engaging and shearing said other of said tapes.

3. The tape applicator head as defined in claim 1, further comprising:

guide means, mounted to the mounting means between the supply means of said one of said tapes and the first dispensing means, for positioning said one of said tapes and defining, with said first dispensing means, a path of travel of said one of said tapes between the guide means and the working surface; and feeder means, through which said one of said tapes extends, said feeder means being positioned intermediate the guide means and the first shearing means, for engaging and moving said one of said tapes between the two dispensing blocks toward the working surface.

4. The tape applicator head as defined in claim 3, wherein said first dispensing means comprises:

a swivel plate, to which the two dispensing blocks are affixed, the swivel plate being pivotally connected to the mounting means; and dispensing actuator means for rotating the swivel plate between a first position, at which a first dispensing block of the two dispensing blocks is positioned adjacent the working surface to engage and lay said one of said tapes onto the working surface in a first direction of the two opposing directions, and a second position, at which the second dispensing block of the two dispensing blocks is positioned adjacent the working surface to engage and lay said one of said tapes onto the working surface in the second direction of the two opposing directions, wherein the two dispensing blocks are disposed on the swivel plate so that the path of travel of said one of said tapes between the guide means and the dispensing means when the swivel plate is disposed in its first position corresponds to the path of travel of said one of said tapes between the guide means and the dispensing means when the swivel plate is disposed in its second position.

5. The tape applicator head as defined in claim 1, wherein the feeder assembly comprises:

a feeder assembly which includes two feeder elements disposed on opposite sides of said one of said tapes extending therethrough and engaging means, connected between the two feeder elements, for moving at least one of the two feeder elements between a disengaged position at which the two feeder elements are spaced from each other and from the tape extending therebetween, and an engaged position at which both feeder elements are engaged with opposite sides of the tape extending therebetween; and insertion means for moving the feeder assembly along the path of travel of said one of said tapes between a retracted position at which the feeder assembly is spaced from the shearing means intermediate the guide means and the shearing means and an extended position at which the two feeder elements of the feeder assembly extend through the shearing means in close proximity to the dispensing blocks.

6. The tape applicator head as defined in claim 1, wherein the means for imparting tension to the other of said tapes and advancing said tape to the working surface is displaceable between the working surface and the supply means for supplying the other of said tapes.

* * * * *